(12) United States Patent
Hoadley

(10) Patent No.: US 6,365,041 B1
(45) Date of Patent: *Apr. 2, 2002

(54) FILTRATION PROCESS UTILIZING HEAT EXCHANGER APPARATUS

(76) Inventor: Jonathan Hoadley, 41 Stonegate, Unionville, CT (US) 06085

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/996,788

(22) Filed: Dec. 23, 1997

(51) Int. Cl.⁷ .............................. C02F 1/02; B01D 65/00
(52) U.S. Cl. .................. 210/137; 2210/181; 2210/186; 2210/321.33; 2210/416.1
(58) Field of Search ................................ 210/137, 175, 210/181, 186, 287, 321.6, 182, 321.66, 321.67, 416.1, 101, 774; 165/901; 203/22, 27, DIG. 8, 24, 26

(56) References Cited

U.S. PATENT DOCUMENTS

| | | | |
|---|---|---|---|
| 4,804,474 A | * | 2/1989 | Blum .......................... 210/641 |
| 4,834,874 A | | 5/1989 | Anthoney et al. |
| 4,952,317 A | | 8/1990 | Culkin |
| 4,995,972 A | | 2/1991 | Kramer et al. |
| 5,014,564 A | | 5/1991 | Culkin |
| 5,232,085 A | * | 8/1993 | Hayashi et al. .............. 202/182 |
| 5,375,422 A | * | 12/1994 | Butts ............................ 62/628 |
| 5,454,952 A | * | 10/1995 | Brewer |
| 5,520,890 A | | 5/1996 | Lorentzen et al. |
| 5,540,846 A | | 7/1996 | Koch et al. |
| 5,556,539 A | | 9/1996 | Mita et al. |
| 5,679,133 A | * | 10/1997 | Moll et al. ...................... 95/45 |

* cited by examiner

Primary Examiner—Joseph W. Drodge
Assistant Examiner—Terry K Cecil
(74) Attorney, Agent, or Firm—Theodore J. Bielen, Jr.

(57) ABSTRACT

A filtration system utilizes a heater 40 and a heat exchange subsystem for elevating the temperature of a feed stream to a membrane filtration unit 12. Upstream from the unit 12, a solids-liquid stream is divided into two streams 32, 33 that pass through respective heat exchangers 22, 28 wherein heat from the concentrate stream 44 and the permeate stream 34 is transferred to the solids-liquid stream before entering the membrane filtration unit 12. Flow regulators are provided to equalize the flow rates of the streams passing through the heat exchangers. The invention lowers the viscosity of the feed stream resulting in the benefits of increased filtration capacity and extended membrane life.

8 Claims, 1 Drawing Sheet

US 6,365,041 B1

FILTRATION PROCESS UTILIZING HEAT EXCHANGER APPARATUS

BACKGROUND OF THE INVENTION

The present invention relates to a novel and useful filtration system utilizing a heat exchanger.

Filtration systems such as those employing membranes have evolved into a preferred system of filtering solids from liquids. It has been found that membrane type filtration apparatuses may be scaled upwardly to fairly large capacities. Membrane filters also are capable of achieving a high degree of separation resulting in crystal-clear permeate. Particle size exclusion is also easily accomplished by selecting the requisite pore size of the membrane, generally from micron size to molecular dimensions. In addition, membranes may be obtained in various types of materials to match the characteristics of the products being separated.

A notable advance in the field of membrane separation may be found in U.S. Pat. Nos. 4,952,317 and 5,014,564 in which a membrane system using a vibratory motion to shear the face of the membrane is described, to successfully separate solids and liquids and prevent the membrane from being fouled. Although the vibratory shear system represents a notable advance in the field of membrane separation, limitations still exists due to the flow rate of the solids-liquid slurry being separated.

U.S. Pat. Nos. 4,834,874, 4,995,972, and 5,540,846 describe filtration processes in which heat is added directly to a filtration vessel, usually for the sake of vaporizing components therewithin.

U.S. Pat. No. 5,520,890 describes a solids-liquid slurry treatment apparatus which utilizes a multifaced catalytic reactor. The gaseous reactants are introduced into a slurry within the tubes of the reactor and a heat exchange medium is circulated around the outside of the tubes to effect a reaction within the reactor.

U.S. Pat. No. 5,556,539 describes an apparatus for separating a liquid by inducing shear in a membrane module. Heat is fed to a filtration device to boil the liquid mixture within the reactor to create a vapor drying apparatus.

A system for providing a heat exchange in a membrane filtration membrane for the purpose of regulating the viscosity on the liquid-solids mixture would be a notable advance in the field of separations.

SUMMARY OF THE INVENTION

In accordance with the present invention a novel and useful filtration system using a sub-system of heat exchange is herein provided.

The system of the present invention utilizes a membrane separator for accepting a solids-liquid inlet stream. The membrane filtration apparatus also includes a permeate and a concentrate outlet for permeate and concentrate streams. The source for the inlet solids-liquid inlet stream may be a holding tank, reservoir, or other similar component. Pump means delivers the solids-liquid inlet stream to the entry or inlet of the membrane filtration apparatus.

The inlet stream at the reservoir may lie at ambient temperature, but is heated by a heat exchanger which transfers heat from the permeate stream from the permeate outlet of the membrane filtration apparatus. In this regard, make-up heat may be selectively added to the solids-liquid inlet stream or to the exiting permeate stream from the membrane filtration apparatus. In any case, the heat exchanger reduces the viscosity of the solids-liquid stream entering the membrane filtration system. In many cases the heater used to elevate the permeate stream or the solids-liquid inlet stream may be a boiler of conventional configuration. In certain cases, a second heat exchanger may be employed to transfer heat between the solids-liquid inlet stream and the concentrate stream, also. In such an instance, the inlet stream would be split into first and second solids-liquid inlet streams, one passing through the first heat exchanger and the second passing through the second heat exchanger. Along these lines, a flow regulator may be also used to equalize the flow rates of the solids-liquid inlet stream and the exiting permeate stream from the membrane filtration apparatus. Likewise, another or second flow regulator may equalize the flow rates of the solids-liquid inlet stream to the flow rate of the concentrate stream. In any case, the membrane filtration system may comprise a vibration induced filtration system in which shear is applied across the membrane by an eccentric drive.

The concentrate stream exiting the concentrate outlet of the membrane filtration apparatus may be shunted to an evaporator. Thus, the concentrate stream may be further separated into solids and liquid which may be vaporized. The solids portion from the evaporator may be employed as a product or byproduct of the present process.

It may be apparent that a novel and useful filtration system has been described.

It is therefore an object of the present invention to provide a filtration system utilizing a membrane filtration apparatus which produces a decrease in viscosity of the inlet stream to the membrane filtration apparatus by the use of one or more heat exchangers.

A further object of the present invention is to provide a filtration system utilizing a membrane filtration apparatus in which the provision of heat to the inlet solids-liquid stream is able to decrease the size of a comparable non-heated membrane filtration apparatus by a large degree to produce an equal capacity.

Another object of the present invention is to provide a filtration system utilizing a membrane filtration apparatus which is far cheaper to manufacture and operate, due to a decrease in viscosity of the inlet solids-liquid stream.

A further object of the present invention is to provide a filtration system utilizing a membrane filtration apparatus in which the solids-liquid inlet stream may be optionally heated through the use of heat exchangers for use during all seasons, where the source of the inlet stream varies in temperature between winter and summer.

A further object of the present invention is to provide a filtration system utilizing a membrane filtration apparatus in which the use of heat exchangers to elevate the temperature of the solids-liquid inlet stream to decrease viscosity of the system prevents overdesigning of the system and result in the savings of capital.

A further object of the present invention is to provide a filtration system utilizing a membrane filtration apparatus in which the capacity of the system may be optionally boosted at certain times to coincide with peak and slack periods of demand, permitting shutting down of the system during slack times without substantial waste.

Another object of the present invention is to provide a filtration system utilizing a membrane filtration apparatus which obviates the need for an inventory of membranes since the life of the membranes may be extended by the use of heat exchangers to elevate the solids-liquid inlet stream to the membrane filtration apparatus.

Another object of the present invention is to provide a filtration system utilizing a membrane filtration apparatus which has wide application in water purification, waste treatment, separation of colloidal suspensions, and the like.

The invention possesses other objects and advantages especially as concerns particular characteristics and features thereof which will become apparent as the specification continues.

Figure 1:
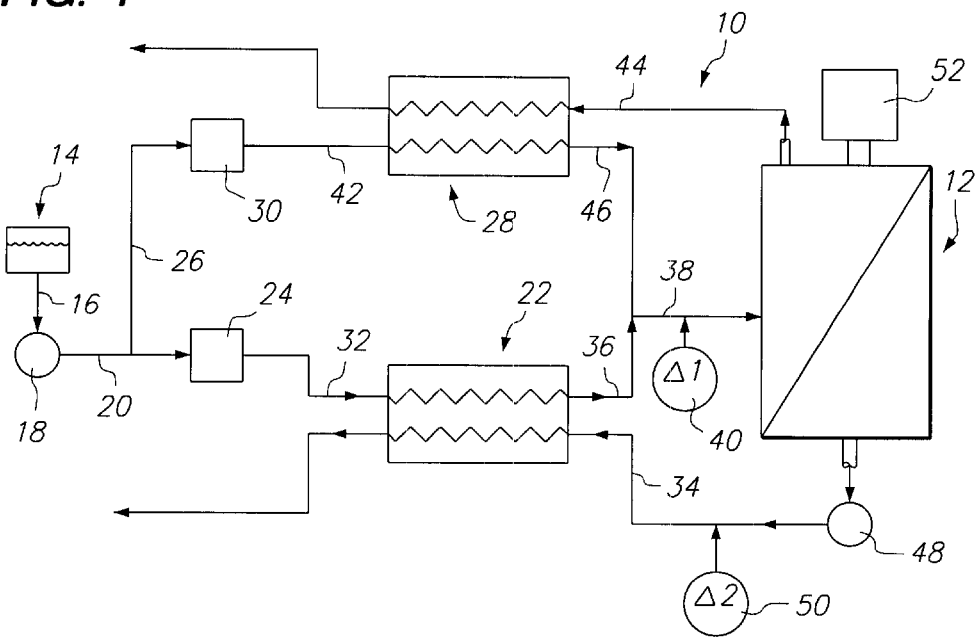
FIG. 1 is a schematic view showing the system of the present invention with a pair of heat exchangers in conjunction with a shear induction membrane filtration apparatus.

For a better understanding of the invention reference is made to the following detailed description of the preferred embodiments thereof which should be referenced to the prior described drawings.

DETAILED DESCRIPTION OF THE PREFERRED EMBODIMENTS

The invention as a whole is shown in the drawings by reference characters 10 or 10A.

Filtration system 10 of the present invention is utilized in conjunction with a membrane filtration apparatus 12. Membrane filtration apparatus 12 may be of many types, such as those using membranes that are spiral wound, tubular cross flow membranes, spinning disc membranes, hollow fiber membranes and the like. Of notable importance is a shear enhanced membrane system which employs a vibratory mechanism. Such a system is less susceptible to fouling than other systems of the prior art. This system may be found in U.S. Pat. No. 4,952,317. Although the latter system was a notable advance in the field of membrane filtration, the present invention further improves membrane filtration systems in order to reduce the overall cost of the same.

Figure 2:
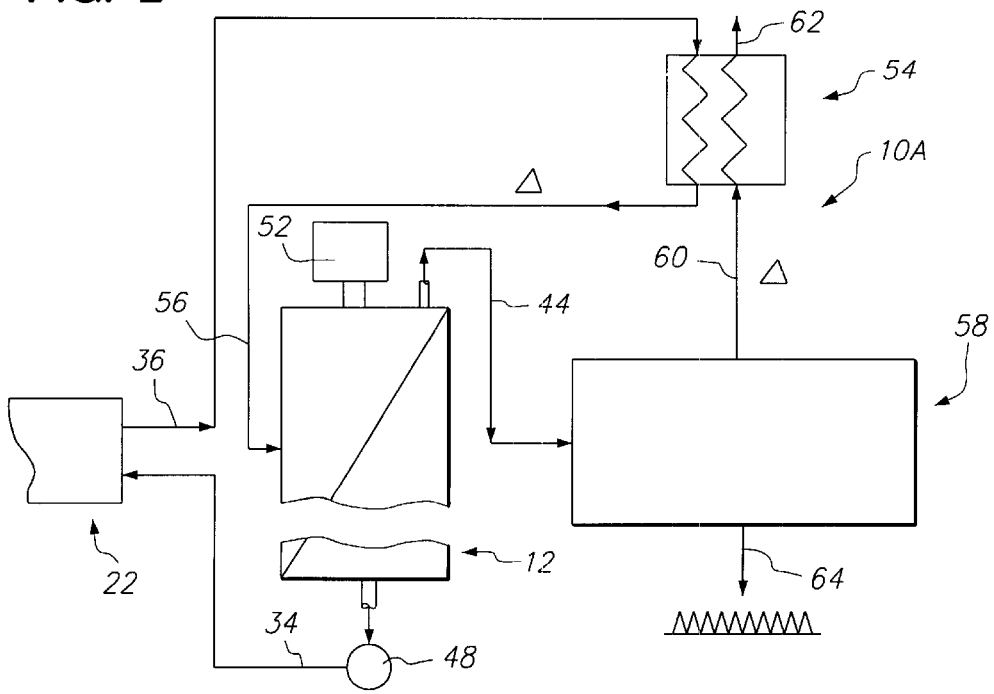
FIG. 2 is a partial schematic view showing another embodiment of the present invention in which an evaporator and condenser are employed.

The filtration apparatus 12 shown in FIGS. 1 and 2 is intended to be an exemplary system having an eccentric drive unit 52. As prior noted, any membrane filtration system would suffice for use with the present system 10.

The present system employs a source 14 of the liquids-solids mixture, which is to be separated by filtration apparatus 12. Source 14 may be a reservoir containing the solids-liquid mixture which may be in the form of a slurry colloidal suspension, and the like. Reservoir or source 14 could contain salt water intended for desalinization, biologically contaminated drinking water, sewage, colloidal mixtures such as clay and water, calcium carbonate and water, coal fines in water, paints and pigments in solvents and the like. solids-liquid stream 16 passes to pump 18 which discharges exit stream 20. In certain cases exit stream 20 is passed to heat exchanger 22 via flow regulator 24. In other cases, stream 20 is split into a second stream 26 and passed to a second heat exchanger 28 via flow regulator 30.

Heat exchangers 22 and 28 may be of the plate and frame type of the shell and tube type, and are preferably a countercurrent flow type exchangers. As may be observed in FIG. 1, heat exchanger 22 accepts the solids-liquid stream 32 which is a portion of stream inlet 20. In other embodiments, solids-liquid streams 20 and 32 may be identical when solids-liquid stream 26 is not employed in the present system 10. Exchanger 22 obtains heat from permeate stream 34 leaving membrane filtration apparatus 12. The heated solids-liquid stream 36 exiting exchanger 22 forms all, or a portion of, inlet stream 38 to membrane filtration apparatus 12. An auxiliary heater 40, typically in the form of a boiler, may be employed to elevate solids-liquid inlet stream 38 prior to entering apparatus 12.

Likewise, with respect to heat exchanger 28, inlet solids-liquid stream 42 is heated by the exchange of heat from concentrate stream 44 exiting apparatus 12. Solids-liquid exit stream 46 from heat exchanger 28 combines with exit stream 36 from heat exchanger 22 to form the solids-liquid inlet to apparatus 12, in certain cases. It should be noted that in many instances, the flow of concentrate from apparatus 10 is at too low a level to warrant the inclusion of heat exchanger 28 in the present system.

Permeate stream 34 from membrane filtration apparatus 12 may optionally include a pump 48, although this is not necessary in most cases. Also, heater 50 may be employed to elevate the temperature of the permeate stream prior to entering heat exchanger 22, in addition to or as an alternate to the use of heater 40, prior described. It should be noted that permeate stream 34 may be delivered to heat exchanger 22 at a higher pressure than solids-liquid inlet stream 32. In this manner, the purity of permeate stream 34 is assured, should a leak develop in heat exchanger 22. Pressurization of permeate stream 34 may be accomplished using a pressure regulator, a valve, or the like.

FIG. 2 shows an alternative system to that depicted in FIG. 1, although many of the components depicted therein are the same. System 10A includes a single heat exchanger 22 in which the solids-liquid inlet stream is heated by the exiting permeate stream 34. The exit solids-liquid stream 36 is passed to a condenser 54 prior to serving as the inlet stream 56 to filtration apparatus 12. concentrate stream 44 coming from filtration apparatus 12 is passed to an evaporator 58. Exit heated vapor stream 60 from evaporator 58 passes to condenser 54 and leaves as a liquid stream 62, which may be used or may be considered to be waste. Solids stream 64 from evaporator 58 may also be employed as desired.

The following is a working example illustrative of a typical application of the systems 10 and 10A of the present invention, but is not deemed to limit the scope of the invention as defined by the claims hereinafter.

WORKING EXAMPLE

A filtration apparatus 12 known as a V♦SEP, manufactured by New Logic International, Emeryville, Calif., was employed in the system 10 of the present invention. The filtration apparatus included a membrane area of 930 square feet using a 0.1 millimicron teflon membrane. The filtration apparatus 12 closely follows that disclosed in U.S. Pat. No. 4,952,317 heretofore noted. Elastomeric seals were composed of EPDM, while the steel trays were formed of 304 stainless steel. The filter pack housing consisted of a vinyl ester 8084 DEREKANE fiberglass structure having feed channels formed of 304 stainless steel grommets. The feed and permeate connections to the filtration apparatus were composed of 2 inch material manufactured by Victaulic. The motor aiding in the eccentric drive 52 consisted of a custom unit of 20 horsepower rating manufactured by Baldor. The motor speed controller was manufactured by AC Tech. The overall size of the filtration unit 12 was 6 ½ feet long, by 4 feet wide, and 17 feet in height. The unit weighed approximately 5,300 pounds.

A heat exchanger 22 was also employed in system 10. The heat exchanger 22 was manufactured by Alfa Laval Thermal, having a 120 gallons per minute flow rate of countercurrent construction. Plate area measured 379.8 square feet and included 147 plates. The plates were constructed of AISI 304 stainless steel while the gasket material was nitrile. The inlet and outlet connection sizes were 4 inches and the overall dimension of the heat exchanger measured 6 feet in length, 2 feet in width, and 3.5 feet in height. The exchanger weighed 1,120 pounds.

To make up the heat entering the permeate stream 34, a boiler of 500,000 BTU/HR was employed. The boiler was manufactured by Ray Pack. A booster pump was placed in front of the exchanger 22 of the type manufactured by Gould, 1.5 horsepower, 3,500 RPM, model number GL885. Another high pressure pump, a Gould 304 stainless steel centrifugal type, 3,500 RPM, series SST-C was also placed in front of the V♦SEP unit.

The components above described were connected and tested at New Logic International facility in Emeryville, Calif. A small booster pump (1.5 HP) was placed in front of the heat exchanger 22 to overcome the pressure drop in the system. The solids-liquid stream passed through the warm side of the exchanger and entered the high pressure pump (series SST-C), which is normally used to drive the separation inside the membrane module of the V♦SEP device. Waste energy from the high pressure pump and the vibration via eccentric drive 52 caused the temperature of the fluid in filtration apparatus 12 to increase by 1.5 degrees centigrade. Since the heat exchanger 22 was designed to operate on a 5 degrees centigrade driving temperature, the boiler was used to heat the permeate exiting the V♦SEP unit to make up the heat necessary to allow the exchanger 22 to operate at capacity. The permeate was recirculated through the exchanger.

It was determined that the viscosity of the solids-liquid stream entering the filtration apparatus 12 (V♦SEP) increased the capacity of the system by a factor of 2, by raising the temperature of the inlet stream 25 degrees centigrade. At 65 degrees centigrade a four fold increase was realized, while at 90 degrees centigrade a 6 fold gain came forth from the present system.

While in the foregoing, embodiments of the present invention have been set forth in considerable detail for the purposes of making a complete disclosure of the invention, it may be apparent to those of skill in the art that numerous changes may be made in such details without departing from the spirit and principles of the invention.

What is claimed is:

1. A filtration system for filtering a solids-liquid inlet stream, said filtration system comprising:

a) a source for the solids-liquid inlet stream;
b) means for splitting the solids-liquid inlet stream into first and second solids-liquid inlet streams;
c) a membrane filtration apparatus including (i) a solids-liquid inlet for receiving said first and second solids-liquid inlet streams and (ii) permeate and concentrate outlets for delivering respective permeate and concentrate streams;
d) a heat exchange subsystem configured to decrease the viscosity of said first and second solids-liquid inlet streams prior to entry into said solids-liquid inlet, said heat exchange subsystem comprising first and second heat exchangers respectively receiving said first and second solids-liquid inlet streams, said first heat exchanger also receiving said permeate stream and adapted to transfer heat therefrom to said first solids-liquid inlet stream, said second heat exchanger also receiving said concentrate stream and adapted to transfer heat therefrom to said second solids-liquid inlet stream;
e) a pump means for delivering the solids-liquid inlet stream to said splitting means;
f) a heater for elevating the temperature of at least one of said permeate stream and said solids-liquid inlet stream; and
g) a first flow regulator to essentially equalize the flow rate of said first solids-liquid inlet stream to the flow rate of said permeate stream at said first heat exchanger.

2. The filtration system of claim 1 in which said heater elevates the temperature of said solids-liquid inlet stream.

3. The filtration system of claim 1 in which said heater elevates the temperature of said permeate stream.

4. The filtration system of claim 1 further comprising a second flow regulator to essentially equalize the flow rate of said second solids-liquid inlet stream to the flow rate of said concentrate stream at said second heat exchanger.

5. The filtration system of claim 1 which said heater is a boiler.

6. The filtration system of claim 1 in which said second heat exchanger comprises an evaporator receiving said concentrate stream from said concentrate outlet.

7. The filtration system of claim 6 in which said second heat exchanger further comprises a condenser for transferring heat from an outlet stream of said evaporator to the second solids-liquid inlet stream.

8. The filtration system of claim 1 in which the membrane filtration apparatus comprises a vibration induced shear filtration system.

* * * * *